April 30, 1963 — J. W. DREWS — 3,087,416
CHARCOAL GRILL
Filed Aug. 4, 1959 — 5 Sheets-Sheet 2

INVENTOR
JOHN W. DREWS
BY Harmon, Pierce + Kurz
ATTORNEY

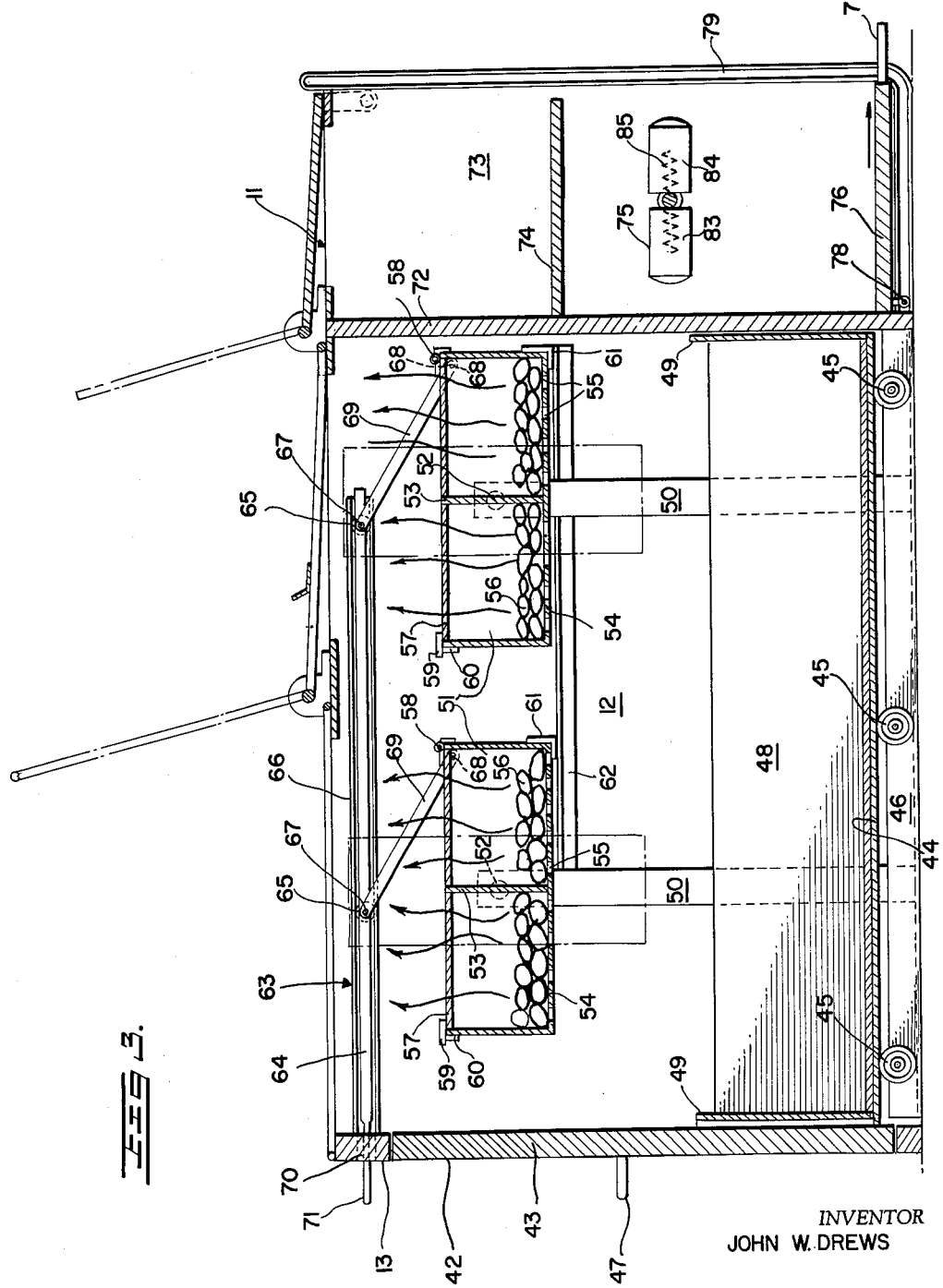

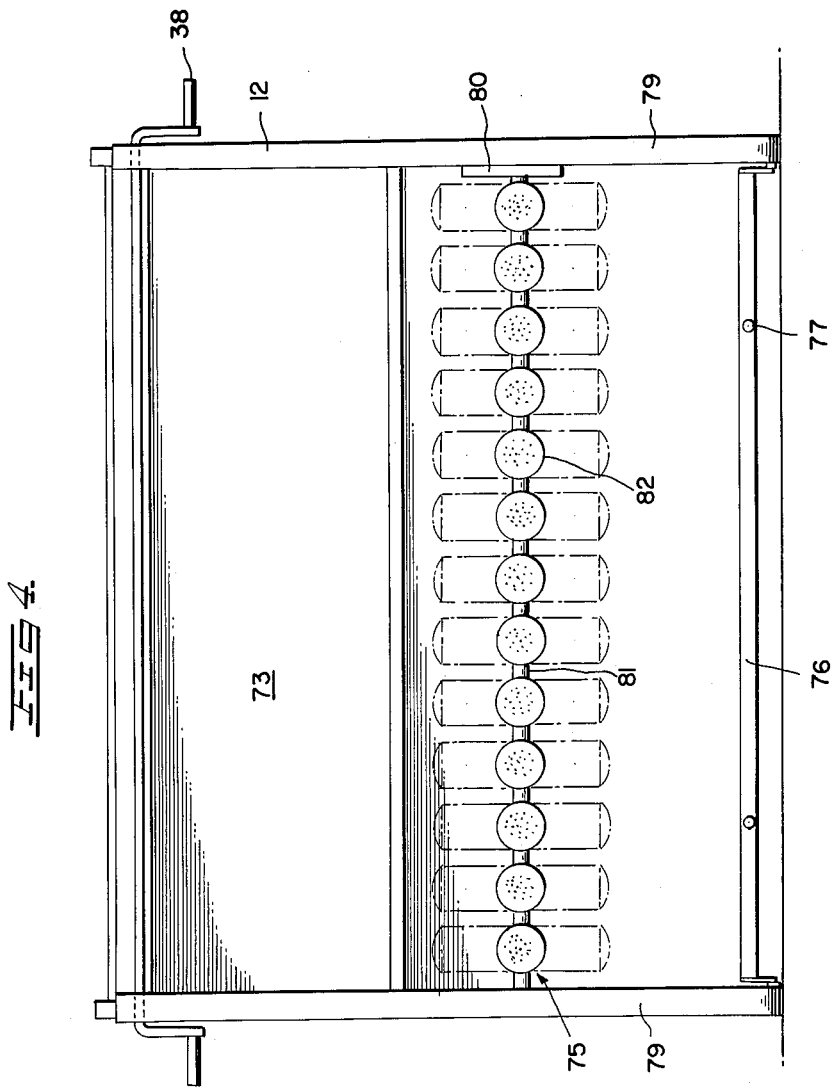

April 30, 1963 J. W. DREWS 3,087,416
CHARCOAL GRILL
Filed Aug. 4, 1959 5 Sheets-Sheet 5
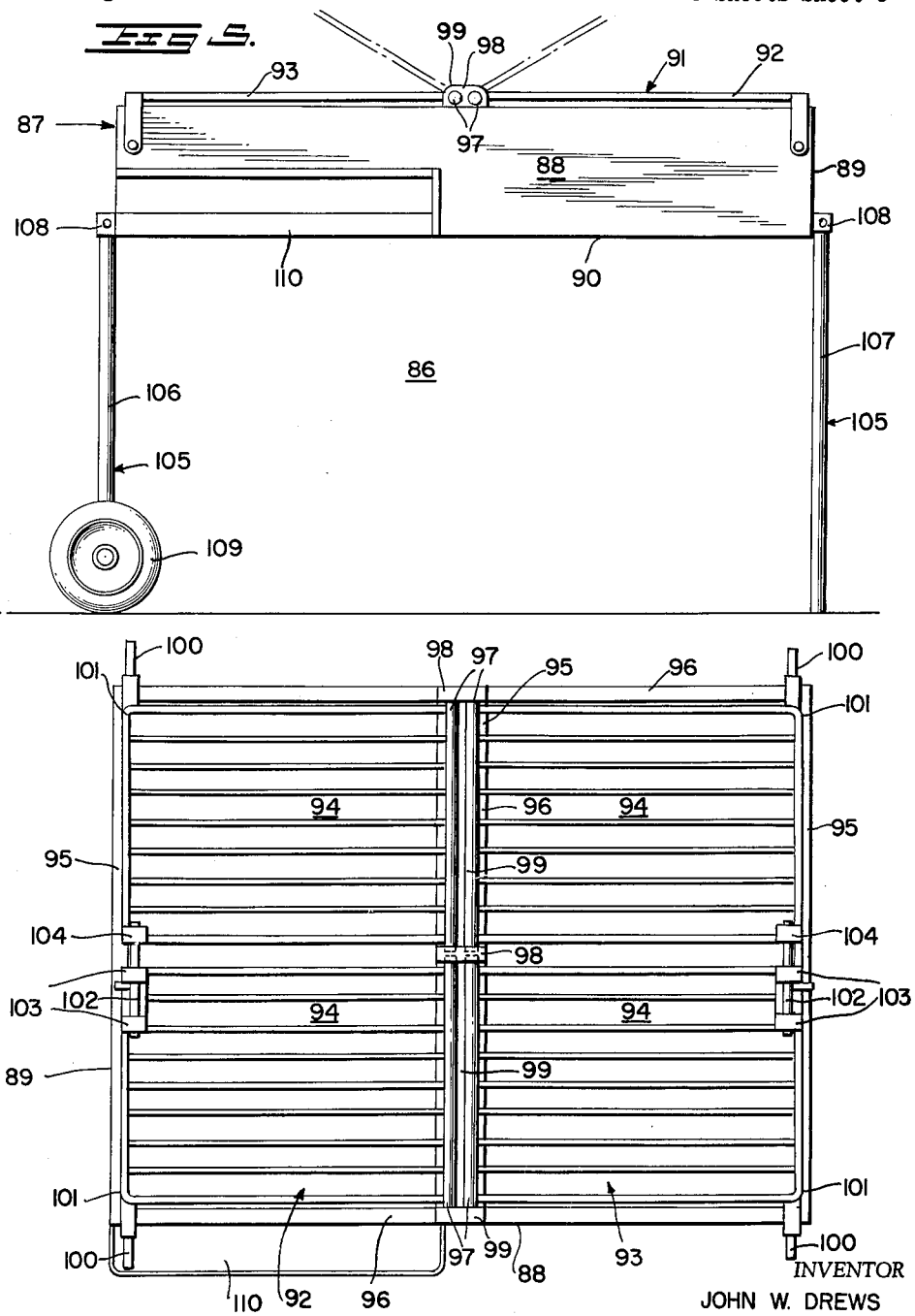
INVENTOR
JOHN W. DREWS
BY Harmon, Pierce, + Kurz
ATTORNEY

United States Patent Office 3,087,416
Patented Apr. 30, 1963

3,087,416
CHARCOAL GRILL
John W. Drews, 4413 Oriole Blvd., Norridge, Ill.
Filed Aug. 4, 1959, Ser. No. 831,624
3 Claims. (Cl. 99—345)

This invention relates to improvements in charcoal grills generally, and more particularly to a charcoal grill for commercial and domestic use which includes a novel mechanism for handling food during a seasoning and grilling cycle.

In the past, charcoal grills generally have been quite limited in size and have required a large degree of manual operation. This manual mode of operation makes the grilling of food a tedious and time consuming task, and causes the presently existing charcoal grills to be unsuitable for commercial uses where a rapid operation is necessary.

For both commercial and domestic usage, the need has arisen for a charcoal grill having a large capacity and a cycle of operation which is of a shorter duration than that provided by the devices known to the prior art. The grill of the present invention is designed to eliminate or reduce much of the manual operation which has been previously required in the preparation of charcoal grilled food, and therefore it is suitable for commercial as well as domestic use.

The primary object of this invention is to provide a charcoal grill having novel food handling features which facilitate a rapid grilling operation.

A specific object of this invention is to provide a charcoal grill having swinging grill members which may be pivoted to cause the inversion and transfer of food material from one grill to another.

Another object of this invention is to provide a charcoal grill having a large grilling capacity and a timed cycle of operation which is primarily automatic.

A further object of this invention is to provide a charcoal grill having swinging charcoal trays to eliminate grease flare up.

A still further object of this invention is to provide a charcoal grill having an automatic seasoning mechanism and a storage compartment for ungrilled food material.

With the foregoing and other objects in view, the invention resides in the following specification and appended claims, certain embodiments and details of construction of which are illustrated in the accompanying drawings in which:

FIGURE 3 is a sectional side elevation of the invention taken along lines 3—3 of FIGURE 2.

FIGURE 4 is a rear elevation of the invention showing the automatic seasoning unit.

FIGURE 5 is a side elevation of an alternate embodiment of the invention.

FIGURE 6 is a plan view of the alternate embodiment of the invention shown by FIGURE 5.

Figure 1:
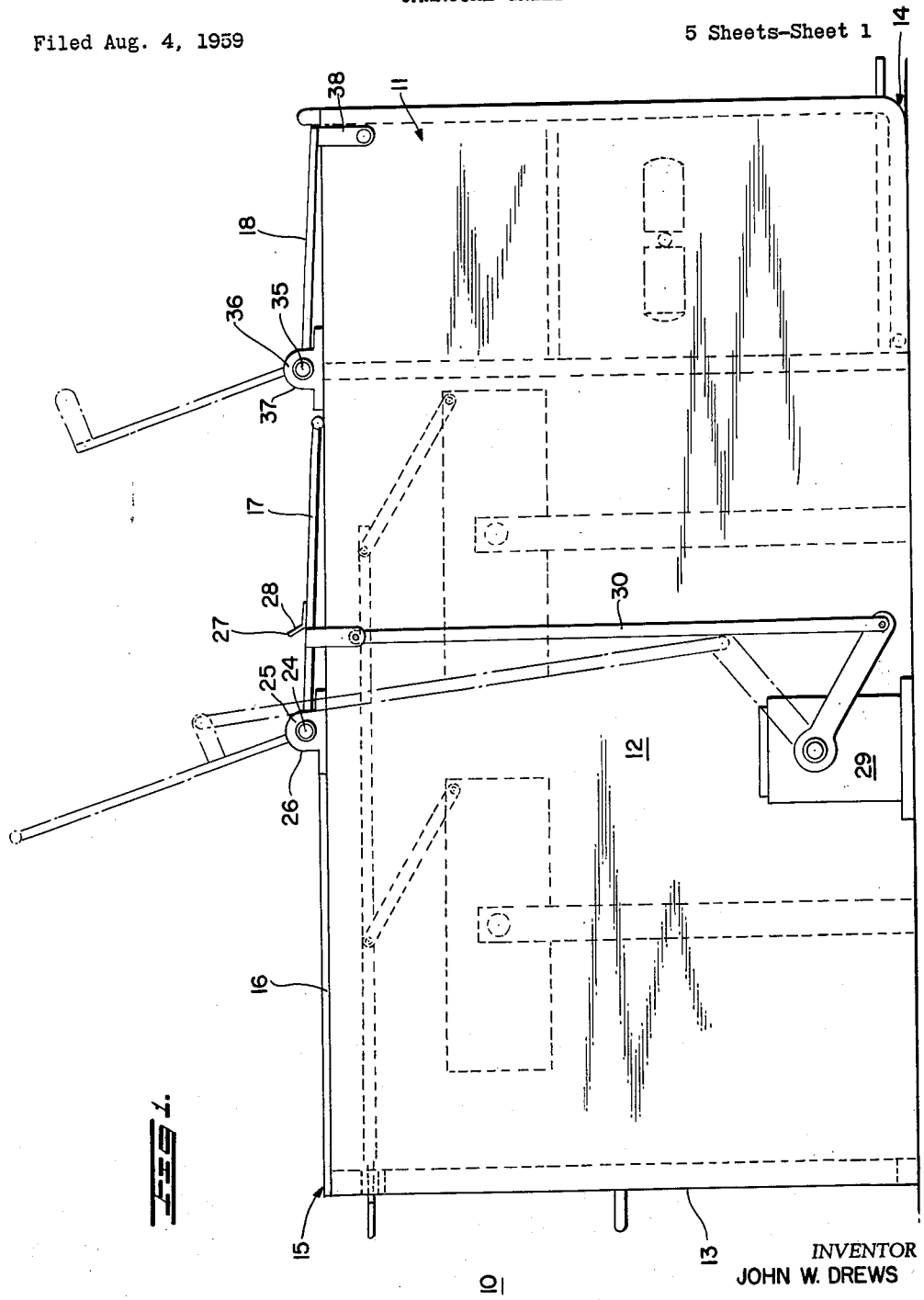
FIGURE 1 is a side elevation of the invention showing some of the major internal components in dotted lines.
Figure 2:
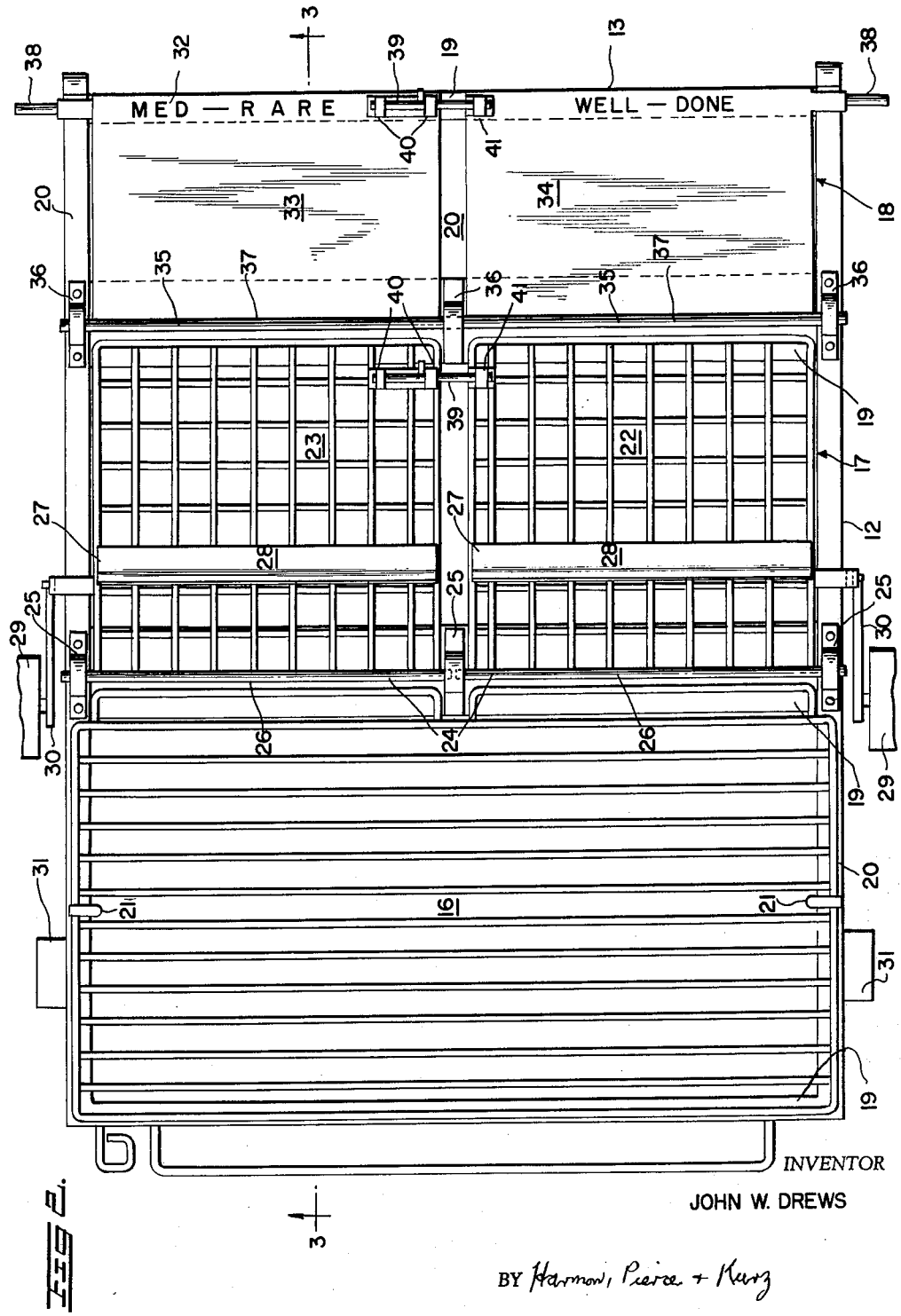
FIGURE 2 is a plan view of the invention showing the structure of the individual grilling units.

Referring to FIGURES 1 and 2, the charcoal grill indicated generally at 10 comprises a body 11 having sidewalls 12, a front wall 13, a bottom section 14, and a top section 15. Top section 15 includes a stationary front grill member 16, a pivoted sectional middle grill 17, and a pivoted sectional rear tray member 18. These grill and tray members rest in a substantially horizontal position upon transverse suport frames 19 and longitudinal support frames 20 which are secured to sidewalls 12 and the front wall 13 of the grill body. Connected to the top of the longitudinal support frames 20 are pivoted clip members 21 which hold stationary grill member 16 in place, but which can be pivoted to provide for the removal of the grill member in any suitable manner.

Middle grill 17 is divided into two individual sections 22 and 23 which may be constructed of stainless steel rods, heavy wire mesh, or other suitable material to provide an apertured grilling surface. Welded or otherwise secured to grill sections 22 and 23 are rod members 24 which project beyond the grill sections into pillow blocks 25. These pillow blocks are attached to the transverse support frames 19, and with rods 24, they form hinge members 26 for the grill sections 22 and 23. Trip angle bars 27 having an inclined face 28, are attached to the grill sections and may be attached so as to be capable of adjustment to different positions on the top surface of the grill sections. Both of the grill sections 22 and 23 may be raised to a position overlying the stationary front grill as shown by the dotted lines in FIGURE 1. With the grill sections in this position, food material will slide along the surface of the grill until it contacts inclined face 28 of the trip angle bar 27 which will cause it to be inverted and dropped from the grill sections 22 and 23 onto stationary grill 16.

Grill sections 22 and 23 may be moved manually by means of handle members (not shown), or they may be actuated by any suitable motor and linkage system. FIGURES 1 and 2 show an actuating means for the grill sections consisting of reversible electric motors 29 driving linkages 30, and motor control switching units 31. The motors 29 may be attached to each side of the grill body 11, and are of a known type which may be set to rotate through any desired portion of an 180 degree arc before reversing. These motors act through linkages 30 to swing the grill sections 22 and 23 from a horizontal position to a position overlying grill 16 and then back to a horizontal position. The motors 29 are actuated by switching units 31, which may contain timer units for automatic motor operation. These timer units can be set so that the motors cause the actuation of the grill sections after a predetermined grilling time has elapsed. The split rear trays may be provided with indicia 32 to show the desired condition of the food material upon completion of the individual grilling cycles as determined by the preset timer units.

Rear tray member 18 is divided into two sections 33 and 34 to which are attached rod members 35. These rod members project into pillow blocks 36 which are secured to transverse support frames 19 to form hinges 37 for tray sections 33 and 34. The tray sections may be moved manually into the dotted line position shown in FIGURE 1 by means of handles 38 which project from the rear portion of each tray section. The tray sections are formed from sheets of stainless steel or other suitable metal sheet material, and may be provided with indentations (not shown) in the shape of the specified food material to be grilled.

In some instances it may become desirable to operate the middle grill 17 and the rear tray 18 as single units rather than as divided sectional units. The individual sections of the middle grill and rear tray may be locked together by means of sliding bolts 39 which are held in place by collars 40 provided upon one of the individual grill and tray sections. The opposite grill and tray sections are provided with aligned collars 41 which receive the bolts 39 when the tray sections are locked together. With the bolts 39 in the locked position, the sectional grill and tray members may be moved as complete units about their hinges 26 and 37.

In FIGURE 3 the front wall 13 of grill body 11 contains an open sided drawer 42 which includes a front wall 43 and a bottom wall 44. The drawer 42 rests upon skate bearings 45 which are secured to channel iron members 46 attached on opposite sides of the grill body to the lower portion of grill sidewalls 12. The drawer is moved within grill body 11 by means of an elongated handle and towel holding member 47 which is secured to front wall 43. Resting upon the bottom wall 44 of the drawer is a rectangular grease tray 48 having vertically extending lift handles 49 provided on each end portion thereof to facilitate the removal of the grease tray from the drawer.

Attached to the channel iron members 46 on each side of the grill body are vertically extending support members 50 which pivotally support metallic charcoal holding trays 51 by means of pivot rods 52 extending between the trays and the support members. Charcoal trays 51 are of rectangular boxlike configuration and are internally divided by a centrally located separator wall 53. Bottom walls 54 of the charcoal trays are provided with draft apertures 55 so that air will be circulated through charcoal 56 which is placed within the trays. Covers 57 are hinged at 58 to the charcoal trays, and latch units 60 secured to the trays act with latching members 59 provided on the tray covers to lock the covers 57 to the trays. Covers 57 may be constructed of expanded metal, fine metallic mesh, or other metallic material which will permit an unobstructed passage of heat but will act to confine the charcoal within the trays when the trays are pivoted.

For normal operation the charcoal trays 51 rest in a horizontal position upon angle iron cross supports 61 which extend between supporting bars 62. Bars 62 run parallel to the grill sidewalls on opposite sides of the grill body and are secured to the vertical support members 50. To extinguish charcoal flareup caused by dripping grease, the charcoal trays may be pivoted about rods 52 by means of an actuating system indicated generally at 63. This system includes an elongated actuator rod 64 provided with roller bushings 65 which ride in a channel track 66 attached to one of the sidewalls 12 of the grill body. Pivotally connected to the actuator rod at 67 and to the charcoal trays at 68 are linkage arms 69 which cause the charcoal trays to swing to the dotted line positions in FIG. 3 when the actuator rod is moved toward the front wall 13 of the grill body. Actuator rod 64 projects through an aperture 70 in the front wall 13, and the projecting end of this rod is provided with a handle member 71 for manual operation. Although a manual actuation system is shown as the preferred means for operating the pivoted charcoal trays 51, it would be feasible to move these trays by means of a suitable linkage system driven by an electric motor.

A vertical wall 72 which extends between the sidewalls 12 of the grill body, is placed rearwardly of charcoal trays 51 and grease tray 48. This wall is constructed of heat insulating material, and is positioned so that it divides the grill body into two sections to provide a separate storage compartment 73. Suitably connected to grill walls 12 and insulating wall 72 is a horizontal storage shelf 74 which overlies an automatic seasoning unit 75. Beneath this seasoning unit and extending across the bottom portion of storage compartment 73 is a horizontal seasoning tray 76 which is provided with rearwardly projecting handles 77. Attached to the sides of seasoning tray 76 are roller bushings 78 which extend into slotted L shaped trackways 79. These trackways are connected to the opposite sidewalls 12 of the grill body and extend horizontally along the bottom portion of the sidewalls from a point adjacent to rear wall 72 to the outer edge of the sidewalls. At this point, they curve upwardly and run in a vertical direction to a point which is slightly above the surface of rear tray 18.

FIGURE 4 shows the automatic seasoning unit 75 driven by an electric motor 80 which is provided on one of the grill walls 12. Motor 80 may be energized when timer switching unit 31, shown in FIG. 2, is actuated, or it may be energized by a separate switching unit. Included with the motor are microswitches which allow the motor shaft to make only one complete 360 degree revolution before the motor is switched off. The construction of this motor unit constitutes no part of the present invention, and any suitable electric motor unit may be used. Extending horizontally across the storage section 73 between the motor unit and the opposite sidewall 12 is a rod member 81 which is rotated by the motor 80. Secured to this rod are a plurality of salt and pepper shakers 82 which are rotated with the rod from a horizontal position through 360 degrees to cause the seasoning of food material contained on seasoning tray 76. The shakers are divided into separate sections 83 and 84 (FIG. 3), for the reception of two separate seasoning materials. Each of the sections 83 and 84 may be provided with an internal metal strip 85 as shown by FIG. 3 which aids in providing a uniform flow of seasoning material from the shakers.

In the operation of this invention as shown by FIGURES 1 through 4, preseasoned food material is placed on grill 17 and tray 18 while unseasoned food material is transferred from storage shelf 74 to seasoning tray 76. The timer mechanisms of switching units 31 are set for the desired grilling time and the switches are actuated to begin the timing cycle. Upon the actuation of switching units 31, the automatic seasoning unit is driven through one 360 degree revolution by driving motor 80 so that the food material on tray 76 is automatically seasoned. After the preset grilling cycle has elapsed, motor units 29 move the sections of middle grill 17 to a position overlying front grill 16 so that the food material from the middle grill is inverted and discharged onto the front grill. After middle grill 17 has been returned to the horizontal position, the sections of rear tray 18 may be manually raised to a position overlying the middle grill so that the food material from the tray is transferred onto the middle grill. To refill the rear tray with seasoned food material, the seasoning tray is grasped by handles 77 and pulled outwardly in the direction of the arrow shown in FIGURE 3. When the roller bushings 78 have reached the outer limit of the horizontal portion of trackways 79, the tray may be lifted upwardly to cause bushings 78 to move up the vertical portion of the trackways. When the seasoning tray reaches the end of the vertical portion of trackways 79, it may be pivoted about the roller bushings to a position overlying rear tray 18 so that the seasoned food material is discharged onto the rear tray. The seasoning tray may then be returned to the bottom of storage compartment 73 and refilled with unseasoned food material for another operational cycle.

If a flareup should occur from the ignition of grease which might drip into the charcoal trays 51, handle 71 may be pulled outwardly from the grill front causing actuating system 63 to pivot the trays to the vertical dotted line position shown in FIGURE 3. In this position, the charcoal is covered by one of the solid endwalls of the tray body, and the flareup will be quickly extinguished. The internal separator wall 53 which is provided within the charcoal trays prevents the charcoal from shifting to one end of a tray when it is pivoted to the vertical position.

FIGURES 5 and 6 show an alternate embodiment of the invention which may prove especially suitable for domestic usages in which the charcoal grill indicated generally at 86 comprises a rectangular boxlike body 87 having sidewalls 88, endwalls 89, a bottom wall 90, and a top section 91. Top section 91 includes two pivoted grill units 92 and 93, which are divided to form four grilling sections 94. The grill units 92 and 93 rest in a horizontal position upon transverse support frames 95 and longitudinal support frames 96 which are secured to sidewalls 88 and endwalls 89 of the grill body. Elongated rod members 97 are welded or otherwise suitably attached to each grill section 94. These rod members project into pillow blocks 98 which are provided on the longitudinal and transverse support frames to form hinge units 99 for the grill sections. The individual grill sections may be manually moved about the hinge units 99, as indicated by the dotted lines in FIGURE 5, by means of handles 100 which project from the outside corner 101 of each grill section. The individual sections of grill units 92 and 93 may be locked together by means of sliding bolts 102 which are held in place by collars 103 mounted on two of the grill sections. The opposite grill sections are provided with aligned collars 104 which receive the sliding bolts to lock the grill sections together.

Grill body 87 is mounted upon a tubular support structure 105 which includes two tubular leg members 106 and a U shaped tubular support member 107. Leg members 106 and support member 107 are attached to opposite ends of grill body 87 by means of lug members 108 which are secured to endwalls 89. Connected to the lower portion of the leg members 106 are circular wheels 109 which aid in moving the charcoal grill. One of the sidewalls 88 of the grill body may be provided with an extended tray 110 to hold seasoning containers.

In the operation of the invention shown by FIGURES 5 and 6, lighted charcoal is placed within the grill body and food material is placed upon one of the grill units 92 or 93. After the food material has remained upon one grill unit for the desired cooking time, the opposite grill unit may be manually moved about its hinges until it rests upon the grill containing the food. Then both of the grill units, with the food material between them, are moved about their hinges until the second grill is back in its original horizontal position. By now returning the first grill to its original position, the food material will have been transferred in an inverted position onto the second grill. If it should become desirable to cook different food materials for different lengths of time, the grill units 92 and 93 may be divided into two sections by unlocking bolt members 102, and each section may be separately operated according to the desired cooking schedule.

It will be readily apparent to those skilled in the art that the present invention provides a novel and improved charcoal grill which is capable of grilling food material in a minimum time with a limited amount of supervision. The arrangement and types of components utilized within this invention may be subject to numerous modifications well within the purview of the inventors who intend only to be limited to a liberal interpretation of the specification and the appended claims.

We claim:

1. A charcoal grill device for grilling food material comprising; a walled enclosure having an open top portion, first and second transverse support members extending across said open top portion, a stationary food supporting grill member extending from the first of said support members to cover a first portion of said open top portion, a plurality of middle food supporting grill units pivotally mounted on said first support member and extending to the second support member, motor driven linkage means connected to said middle grill units for moving the same about the pivotal mounting thereof, means for actuating said motor driven linkage at predetermined timed intervals, a food tray unit pivoted on said second support member and extending over the remaining portion of said open top portion of said enclosure, said walled enclosure being internally divided to provide a front heating compartment beneath said stationary and middle grill units and a storage compartment beneath said food tray unit, said storage compartment containing food seasoning means, a movable seasoning tray beneath said seasoning means, guide track means carried by said walled enclosure for guiding said seasoning tray from said storage compartment to a position adjacent said food tray unit, means to mount said seasoning tray on said guide track means, whereby food material may be conveyed from said seasoning means to said food tray for initiating a cooking cycle and first and second charcoal containing trays mounted in said heating compartment and located beneath said stationary grill member and said middle grill units respectively to provide separate heating sources for varying the degree of heat supplied to said grill member and to said grill units.

2. A charcoal grill device for grilling food material comprising; a walled enclosure having an open top portion and at least one open end portion, first and second transverse support members extending across said open top portion, a stationary food supporting grill member mounted on the top edge of said enclosure and the first of said support members remote from said one open end portion and extending from said first support member to cover a first portion of said open top portion, a plurality of middle food supporting grill units pivotally mounted on said first support member and extending to the second support member, motor driven linkage means connected to said middle grill units for moving the same about the pivotal mounting thereof, means for actuating said motor driven linkage at predetermined timed intervals, a rear food tray unit pivoted on said second support member and extending to the open end portion of said enclosure, said walled enclosure being internally divided to provide a front heating compartment beneath said stationary and middle grill units and a rear storage compartment beneath said rear food tray unit, said rear storage compartment containing food seasoning means, a movable seasoning tray having an initial horizontal position beneath said seasoning means, guide track means carried by said enclosure for guiding said seasoning tray from said initial position first horizontally outwardly and then upwardly to a position adjacent said rear food tray unit means to mount said seasoning tray on said guide track means, whereby food material may be conveyed from said automatic seasoning unit to said rear food tray for initiating a cooking cycle and first and second charcoal containing trays mounted in said heating compartment beneath said stationary grill member and said middle grill units respectively to provide separate heating sources for varying the degree of heat supplied to said grill member and said grill units.

3. A charcoal grill device for grilling food material comprising; a walled enclosure having an open top portion, a removable grease tray means slidably supported on the bottom of said enclosure and underlying substantially the entire area of said open top portion, a transverse support member extending across the central portion of said enclosure at the top edge thereof, a stationary food supporting grill member mounted on the top portion of said enclosure and said support member and extending from said support member to cover a first portion of said open top portion, a plurality of individually pivoted food supporting grill sections mounted on said support member and extending from said support member to cover the remaining portion of said open top portion, said pivoted grill sections further including transversely extending trip angle bars having upwardly extended faces adjacent to the pivoted side of said sections, means to selectively lock said pivoted grill sections to move in unison, linkage means connected to each of said pivoted grill sections for pivoting said grill sections upwardly and toward said stationary grill member, and motor means connected to said linkage means for operating said linkage means at predetermined timed intervals, first and second charcoal containing trays beneath said stationary grill member and said grill sections respectively, whereby food deposited on said grill sections will be transferred from said grill sections to said stationary grill member; the upwardly inclined faces of said trip angle bars causing said food material to be inverted before being deposited on said stationary grill member, and whereby said first and second charcoal containing trays provide separate heating sources for varying the degree of heat beneath said grill member and said grill sections.

(References on following page)

References Cited in the file of this patent

UNITED STATES PATENTS

| | | | |
|---|---|---|---|
| 271,842 | Hanchett | Feb. 6, | 1883 |
| 943,593 | Dresdner | Dec. 14, | 1909 |
| 1,108,553 | Copeman | Aug. 25, | 1914 |
| 1,621,234 | Carpenter | Mar. 15, | 1927 |
| 1,654,810 | Hillyard | Jan. 3, | 1928 |
| 1,878,348 | Te Selle | Sept. 20, | 1932 |
| 1,986,524 | Perks et al. | Jan. 1, | 1935 |
| 2,067,849 | Hunter | Jan. 12, | 1937 |
| 2,114,698 | Babin | Apr. 19, | 1938 |
| 2,390,455 | Nalbach | Dec. 4, | 1945 |
| 2,522,448 | Husk et al. | Sept. 12, | 1950 |
| 2,573,988 | Saltzberg | Nov. 6, | 1951 |
| 2,781,037 | Vuncannon | Feb. 12, | 1957 |
| 2,851,941 | Cogar | Sept. 16, | 1958 |
| 2,897,813 | Schindler | Aug. 4, | 1959 |
| 2,898,846 | Francia | Aug. 11, | 1959 |
| 2,925,813 | Yervant | Feb. 23, | 1960 |
| 2,938,102 | Savio | May 24, | 1960 |